(12) United States Patent
Nakatsugawa et al.

(10) Patent No.: US 8,735,841 B2
(45) Date of Patent: May 27, 2014

(54) RADIOLOGICAL IMAGE DETECTION APPARATUS AND METHOD FOR MANUFACTURING THE SAME

(75) Inventors: Haruyasu Nakatsugawa, Kanagawa (JP); Yasuhisa Kaneko, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 196 days.

(21) Appl. No.: 13/338,972

(22) Filed: Dec. 28, 2011

(65) Prior Publication Data

US 2012/0193540 A1   Aug. 2, 2012

(30) Foreign Application Priority Data

Jan. 31, 2011   (JP) .................................. 2011-019324

(51) Int. Cl.
*G01T 1/20* (2006.01)
(52) U.S. Cl.
USPC .................................................... 250/370.11
(58) Field of Classification Search
USPC .................................................... 250/370.11
See application file for complete search history.

(56) References Cited

U.S. PATENT DOCUMENTS

| 5,728,213 | A * | 3/1998 | Kurata et al. | .................. 117/19 |
| 2008/0083877 | A1* | 4/2008 | Nomura et al. | .......... 250/370.11 |
| 2010/0108912 | A1 | 5/2010 | Sakai et al. | |
| 2010/0117006 | A1 | 5/2010 | Sawamoto et al. | |
| 2011/0006213 | A1* | 1/2011 | Sato et al. | .................. 250/367 |

FOREIGN PATENT DOCUMENTS

| JP | 2005-337962 A | 12/2005 |
| JP | 2008-051793 A | 3/2008 |
| JP | 2011-017683 A | 1/2011 |
| WO | 2008/126757 A1 | 10/2008 |
| WO | 2008/126758 A1 | 10/2008 |

OTHER PUBLICATIONS

Japanese Office Action "Notification of Reasons for Refusal" dated Jan. 29, 2013, which corresponds to Japanese Patent Application No. 2011-019324 and is related to U.S. Appl. No. 13/338,972 with partial translation.

* cited by examiner

*Primary Examiner* — David Porta
*Assistant Examiner* — Hugh H Maupin
(74) *Attorney, Agent, or Firm* — Studebaker & Brackett PC

(57) ABSTRACT

A radiological image detection apparatus includes: a scintillator which is formed out of a group of columnar crystals in which crystals of a fluorescent material emitting fluorescence when irradiated with radiation have grown into columnar shapes; and a photodetector which is provided on a radiation entrance side of the scintillator and which detects the fluorescence emitted by the scintillator as an electric signal. A high activator density region whose activator density is higher than activator density of a region on an opposite side to the radiation entrance side in the scintillator is provided and disposed on the photodetector side in the scintillator.

22 Claims, 11 Drawing Sheets

RADIOLOGICAL IMAGE DETECTION APPARATUS AND METHOD FOR MANUFACTURING THE SAME

CROSS-REFERENCE TO RELATED APPLICATIONS

This application is based on and claims priority under 35 USC 119 from Japanese Patent Application No. 2011-019324 filed on Jan. 31, 2011; the entire content of which is incorporated herein by reference.

BACKGROUND

1. Technical Field

The present invention relates to a radiological image detection apparatus for use in a medical X-ray imaging system etc., and a method for manufacturing the same.

2. Related Art

In recent years, a DR (Digital Radiography) using an X-ray image detection apparatus such as an FPD (Flat Panel Detector) for converting X-rays into digital data has been put to practical use. The X-ray image detection apparatus has been being widely used rapidly due to a merit that an image can be confirmed in real time as compared with a background-art CR (Computed Radiography) system using an imaging plate including a photostimulable phosphor (storage phosphor).

Various systems have been proposed for an X-ray image detection apparatus. For example, there is an indirect conversion system in which X-rays are once converted into visible light by a scintillator of CsI:Tl or GOS ($Gd_2O_2S$:Tb), and the converted light is converted into electric charges by a semiconductor layer and accumulated (for example, Patent Document 1 (JP-A-2008-51793) and Patent Document 2 (JP-A-2011-17683)).

For example, when such an X-ray image detection apparatus is used for a living body, it is often preferable that the dose of X-rays is low. A scintillator high in amount of luminescence and superior in sensitivity is therefore desired. Addition of an activator to a host of a fluorescent material is known as a method for enhancing the amount of luminescence of the scintillator. In Patent Document 1, description has been made on an X-ray image detection apparatus having a sensor board and a scintillator which includes columnar crystals and on which X-rays are incident from the opposite side to the sensor board, wherein: the density of an activator is increased in an X-ray entrance side region of the scintillator.

Here, the amount of luminescence is increased with increase in the density of the activator on the X-ray entrance side. However, when the region with the increased activator density is distant from a photosensor as in Patent Document 1, MTF (Modulation Transfer Function) deteriorates while absorption of light emitted from the scintillator increases. It is therefore difficult to obtain a sufficient effect in spite of the increase in the activator density.

In addition, when the activator density is enhanced in a region of an early stage of vapor deposition in the scintillator, particularly crystal growth in the scintillator is greatly adversely affected to disorder crystallinity. Light diffused thus among columnar crystals leads to deterioration of MTF.

In addition, the disordered crystallinity leads to deterioration in strength of the scintillator. Particularly when the scintillator is pasted on the sensor board, front end portions of columnar crystals in the scintillator may be damaged due to the load applied to the scintillator in the pasting step. If it is difficult to press the scintillator against the sensor board sufficiently in the pasting step, unevenness may appear in a detected image due to unevenness in adhesion between the sensor board and the scintillator. In order to avoid damage in the pasting step, it may be considered that the temperature of a support during vapor deposition is controlled to flatten the front end portions of the columnar crystals. However, thermal deformation such as warp may occur in the support, to impede the pasting.

SUMMARY

An illustrative aspect of the invention is to provide a radiological image detection apparatus and a method for manufacturing the same, in which the amount of luminescence and MTF can be increased sufficiently.

According to an aspect of the invention, a radiological image detection apparatus includes: a scintillator which is formed out of a group of columnar crystals in which crystals of a fluorescent material emitting fluorescence when irradiated with radiation have grown into columnar shapes; and a photodetector which is provided on a radiation entrance side of the scintillator and which detects the fluorescence emitted by the scintillator as an electric signal. A high activator density region whose activator density is higher than activator density of a region on an opposite side to the radiation entrance side in the scintillator is provided and disposed on the photodetector side in the scintillator.

With the radiological image detection apparatus, the density of an activator is increased so that the amount of luminescence and MTF can be increased sufficiently.

DETAILED DESCRIPTION

An example of an X-ray image detection apparatus (radiological image detection apparatus) for explaining an embodiment of the invention will be described below with reference to FIGS. 1 to 6.

Constituents similar to those in the aforementioned configuration are referred to by the same numerals correspondingly, and description thereof will be omitted or simplified.

[1. Overall Configuration]

Figure 1:
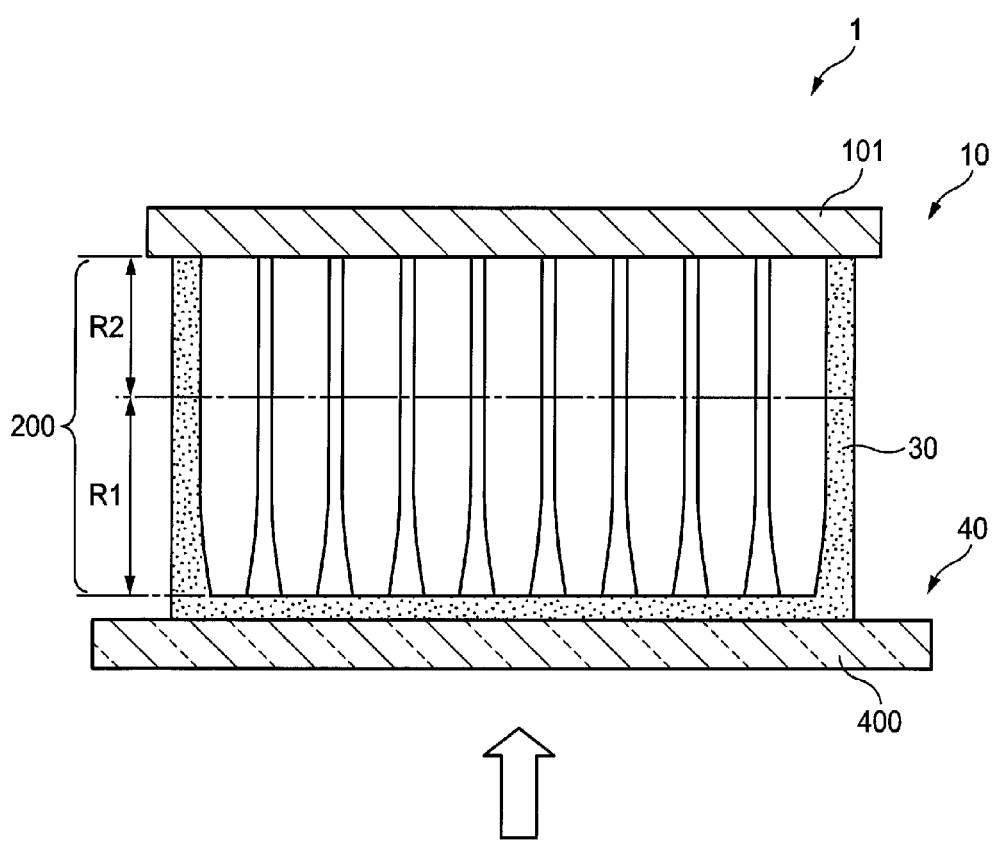
FIG. 1 is a side sectional view schematically showing the outline configuration of an X-ray image detection apparatus.

FIG. 1 is a side sectional view schematically showing the outline configuration of an X-ray image detection apparatus 1 of an indirect conversion system. The X-ray image detection apparatus 1 has a scintillator panel 10 and a photodetector 40. The scintillator panel 10 includes a scintillator 200 which emits light when irradiated with X-rays. The photodetector 40 detects the light emitted from the scintillator 200 as an electric signal.

In the X-ray image detection apparatus 1, X-rays transmitted through a subject are radiated from the photodetector 40 side toward the scintillator panel 10, as indicated by an outline arrow in FIG. 1. When the X-rays enter the scintillator 200 through a sensor board 400 of the photodetector 40, the scintillator 200 absorbs the X-rays to emit light. The light enters each photoelectric conversion element formed in the sensor board 400. Electric charges accumulated in the photoelectric conversion element of the sensor board 400 are outputted as an electric signal.

A not-shown control module is provided on the opposite side to the X-ray entrance side of the scintillator panel 10. The control module has: a circuit board mounted with an IC as a control portion for driving and controlling the sensor board 400, an IC for processing an image signal, etc.; a power supply circuit; and so on. The control module is assembled integrally with the scintillator panel 10 and the photodetector 40.

[2. Configuration of Photodetector]

Figure 2:
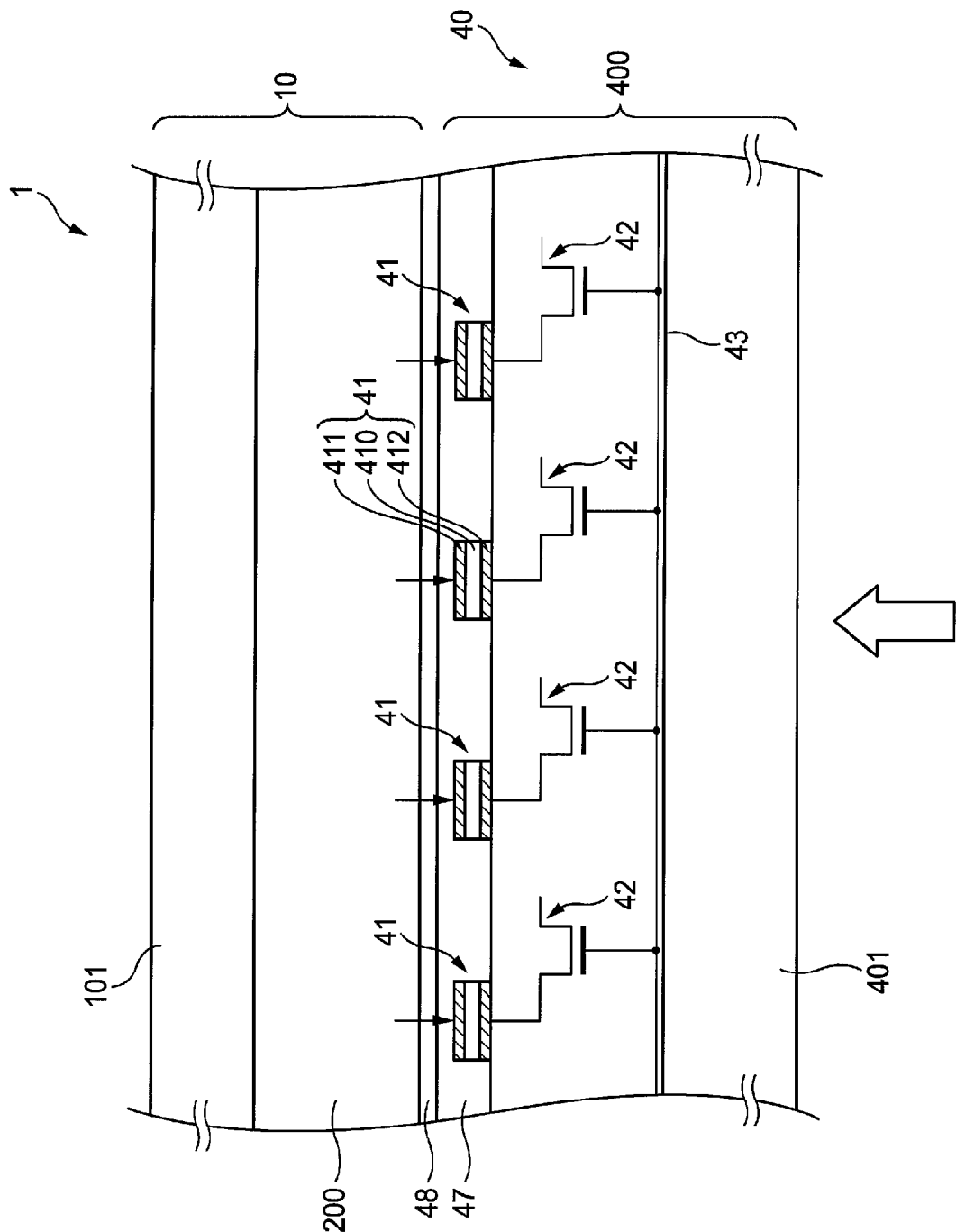
FIG. 2 is a side sectional view schematically showing the outline configuration of a photodetector.
Figure 3:
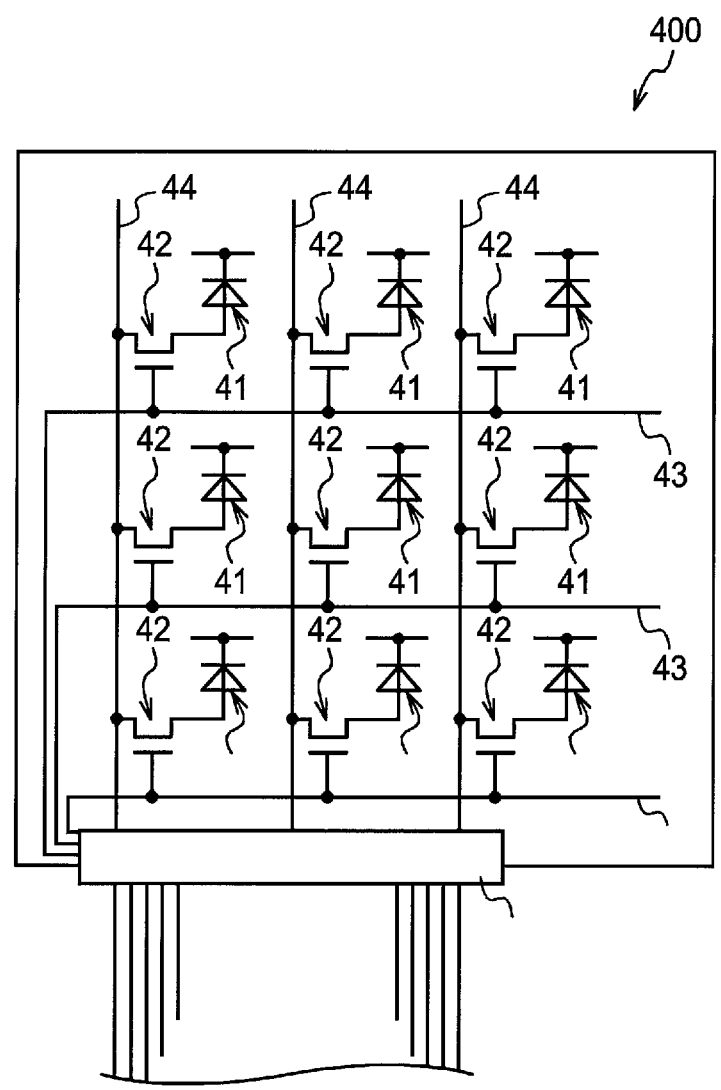
FIG. 3 is a plan view schematically showing a sensor board.

FIG. 2 is a side sectional view schematically showing the configuration of the photodetector 40. FIG. 3 is a plan view schematically showing the configuration of the sensor board 400. The photodetector 40 has a sensor board 400 which is formed into a rectangular shape in plan view. A semiconductor layer is formed in the sensor board 400. The sensor board 400 includes an insulating substrate 401 of glass or the like, photoelectric conversion elements 41 such as a-Si photodiodes, and switching devices 42 such as thin film transistors (TFTs).

For example, a glass substrate, various ceramic substrates or a resin substrate may be used as the insulating substrate 401. The insulating substrate 401 is not limited to these materials.

Each photoelectric conversion element 41 is constituted by a photoconductive layer 410, a bias electrode 411 and a charge collection electrode 412 which are stacked in layers. By the photoconductive layer 410, light (indicated by an outline arrow in FIG. 2) incident on the photoconductive layer 410 from the scintillator 200 of the scintillator panel 10 is converted into electric charges. The bias electrode 411 applies a bias voltage to the photoconductive layer 410. The charge collection electrode 412 collects the electric charges accumulated in the photoconductive layer 410. As shown in FIG. 3, the photoelectric conversion elements 41 are arrayed two-dimensionally, and each photoelectric conversion element 41 corresponds to a pixel of an image to be detected by the photodetector 40.

A switching device 42, a gate line 43 and a data line 44 are provided for each photoelectric conversion element 41, as shown in FIG. 3. Each gate line 43 and each data line 44 are extended to a connection terminal 45, and connected to the circuit board of the control module (FIG. 1) through flexible wires 46 of an anisotropic conductive film or the like, which wires 46 are connected to the connection terminal 45. The switching devices 42 are switched on/off line by line by a control signal transmitted from the control portion mounted in the circuit board through the gate lines 43. Electric charges of the photoelectric conversion elements 41 whose switching devices 42 are switched on are read as an image signal by a signal processing portion of the circuit board through the data lines 44. The electric charges of the photoelectric conversion elements 41 are read sequentially line by line so that a two-dimensional image is detected.

The aforementioned gate lines 43, data lines 44, switching devices 42 and photoelectric conversion elements 41 are formed on a scintillator panel 10 side surface of the insulating substrate 401. Those gate lines 43, data lines 44, switching devices 42 and photoelectric conversion elements 41 are formed sequentially on the insulating substrate 401 by a photo-etching process or the like. In FIG. 2, the surface of the sensor board 400 is flattened by a resin film 47 provided in an outermost layer of the sensor board 400. However, the resin film 47 can be dispensed with. The sensor board 400 and the scintillator panel 10 are pasted to each other through an adhesive layer 48 so that the scintillator 200 adheres to the sensor board 400 through the adhesive layer 48.

The adhesive layer 48 or the resin film 47 between the sensor board 400 and the scintillator panel 10 may be dispensed with. The scintillator panel 10 may be pressed against the surface of the sensor board 400 so as to adhere to the sensor board 400 directly.

Resin forming a resin layer such as a flattening layer, an adhesive layer or a matching oil layer of transparent liquid or gel which is provided between the sensor board 400 and the scintillator panel 10 is not limited particularly as long as the resin allows scintillation light emitted from the scintillator 200 to reach the photodetector 40 without being substantially attenuated.

Polyimide, parylene, etc. may be used as the resin forming the flattening layer. Polyimide with good film-forming properties is preferable.

An adhesive agent which is optically transparent against the scintillation light emitted from the scintillator 200 is preferable as the adhesive agent of the adhesive layer. For example, thermoplastic resin, UV-curable adhesive, heat curing adhesive, room temperature setting adhesive, double-faced adhesive sheet, etc. may be used. In order to prevent the sharpness of an image from being lowered, it is preferable to use an adhesive agent of low-viscosity epoxy resin because the adhesive agent can form a sufficiently thin adhesive layer with respect to the pixel size of the photodetector 40.

In addition, the resin layer such as the flattening layer or the adhesive layer is preferably not thicker than 50 μm, more preferably in a range of from 5 μm to 30 μm in view from sensitivity and image quality.

[3. Configuration of Scintillator Panel]

[3-1. Overall Configuration]

As shown in FIG. 1, the scintillator panel 10 has a support (substrate) 101, a scintillator 200 formed on the support 101 by a vapor deposition method, and a protective film (moisture-resistant film) 30 of parylene or the like for covering and sealing the scintillator 200 on the support 101. The protective film of parylene formed by a vapor deposition method has good adhesion to the scintillator 200 and further has flexibility. Thus, the protective film can well follow the warp or the like of the support 101.

The support 101 is formed into a plate-like shape out of a material of Al or the like, which is high in X-ray transmittance and which can reflect light. The support 101 is not limited to a plate made from Al. One of a carbon plate, a CFRP (Carbon Fiber Reinforced Plastic) plate, a glass plate, a quartz substrate, a sapphire substrate, etc. may be selected suitably and used as the support 101. The support 101 is not limited thereto particularly as long as the scintillator 200 can be formed on the surface of the support. However, light metal such as Al may be used as the material of the support when the support 101 is also used as a light reflecting member.

In the scintillator panel 10, the support 101 is not essential. That is, the scintillator 200 may be used after the scintillator 200 is formed by deposition using a substrate for deposition and separated from the substrate. A light reflecting member may be provided on the opposite side to the X-ray entrance side of the scintillator 200.

The scintillator 200 is formed by adding Tl as an activator to CsI used as a host. The activation of Tl can enhance the amount of luminescence of the scintillator.

The scintillator 200 in this example is formed using CsI:Tl (thallium doped cesium iodide) as a fluorescent material. The scintillator 200 may be formed using another fluorescent material such as NaI:Tl (thallium doped sodium iodide) or CsI:Na (sodium doped cesium iodide). The scintillator 200 is preferably formed using CsI:Tl as the material to obtain an emission spectrum in conformity to the maximum value (about 550 nm) of spectral sensitivity of an a-Si photodiode.

Figure 4:
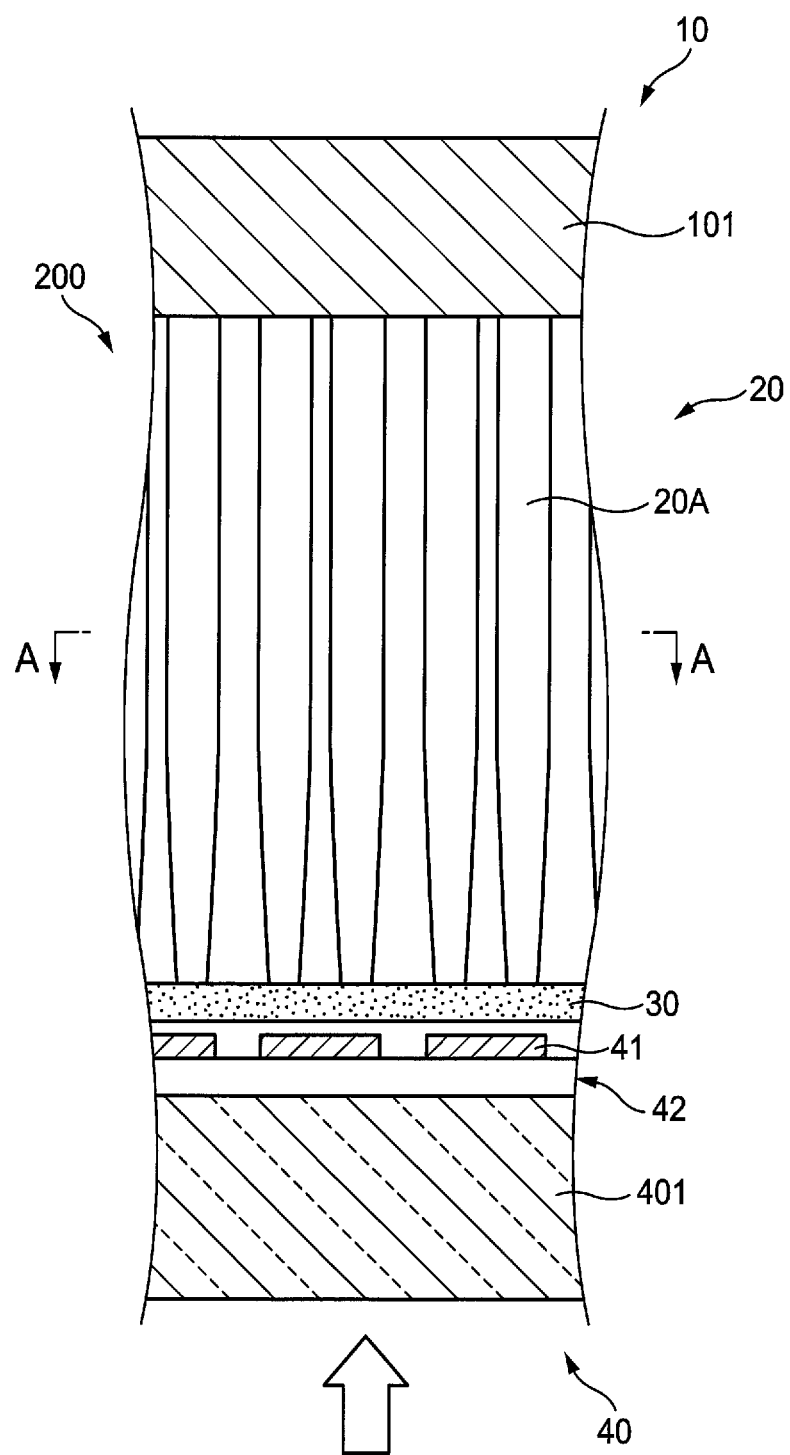
FIG. 4 is a side sectional view schematically showing a scintillator panel.

FIG. 4 is a side sectional view schematically showing the structure of the scintillator 200. The scintillator 200 has a columnar portion 20 which is formed out of a group of columnar crystals 20A.

Fluorescence emitted from the scintillator 200 when the scintillator 200 is irradiated with X-rays is guided in a columnar height direction (crystal growth direction) by the columnar crystals 20A so as to enter the photodetector 40. On this occasion, light traveling on the support 101 side is partially reflected by the support 101 so as to enter the photodetector 40.

For example, OPC (Organic Photoelectric Conversion) materials, organic TFT, TFT using amorphous oxide (such as a-IGZO), flexible materials (aramid or bionanofiber) etc. may be used for the photodetector 40 and the scintillator panel 10. Those device-relevant materials will be described later.

[3-2. Configuration of Columnar Portion]

The columnar portion 20 is an aggregate of a large number of columnar crystals 20A. In the example shown in FIG. 4, each columnar crystal 20A stands substantially perpendicularly to the support 101. The columnar crystal 20A in the example is formed into a shape tapered on its front end side. The front end portion of the columnar crystal 20A may be polished. The front end portions of a plurality of columnar crystals 20A face one pixel (photoelectric conversion element 41) of the photodetector 40.

The columnar crystals 20A are better in crystallinity and larger in amount of emission of fluorescence than non-columnar crystals. In addition, the columnar crystals 20A adjacent to each other through an air gap are provided to stand in the thickness direction of the support 101, so that the columnar crystals 20A serve as light guide to guide light in the columnar height direction. Due to the light guide effect of the columnar crystals 20A, light diffusion among pixels can be suppressed to sharpen a detected image.

Figure 5:
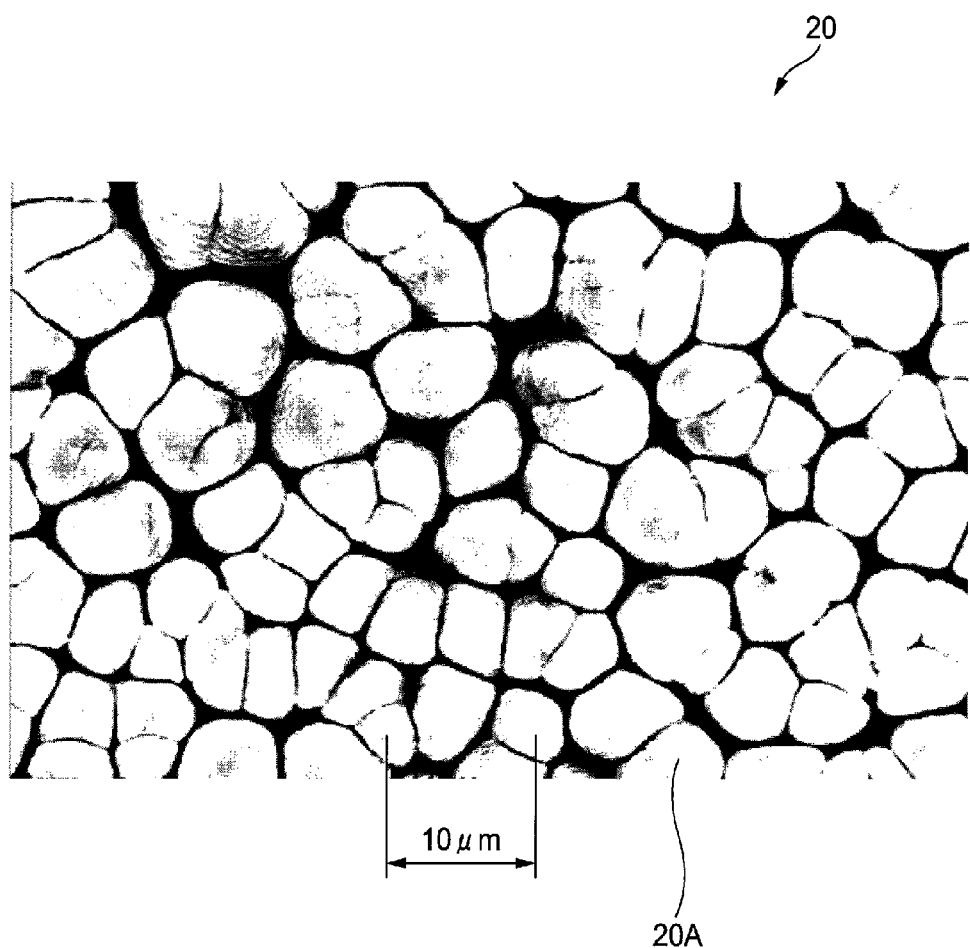
FIG. 5 is an electron microscope photograph (SEM image) sectionally showing columnar crystals of a columnar portion.

FIG. 5 shows an electron microscope photograph of the columnar portion 20 in section taken on line A-A in FIG. 4 (in section taken at the substantial center in the height direction of the columnar portion 20). There is an air gap between adjacent columnar crystals 20A (deep color portions in FIG. 5). Each columnar crystal 20A has a substantially uniform sectional diameter with respect to the growth direction of the crystal.

In consideration of X-ray absorption power corresponding to required sensitivity, the thickness of the columnar portion 20 is determined to be about 200 μm for use in mammography and not lower than 500 μm for use in general photography. When the columnar portion 20 is too thick, the utilization efficiency of luminescence is apt to deteriorate due to absorption and scattering of light, and so on. Therefore, the thickness of the columnar portion 20 is determined to be an appropriate value in consideration of both the sensitivity and the utilization efficiency of luminescence.

[3-3. Activator Density (Doping Density)]

Figure 6:
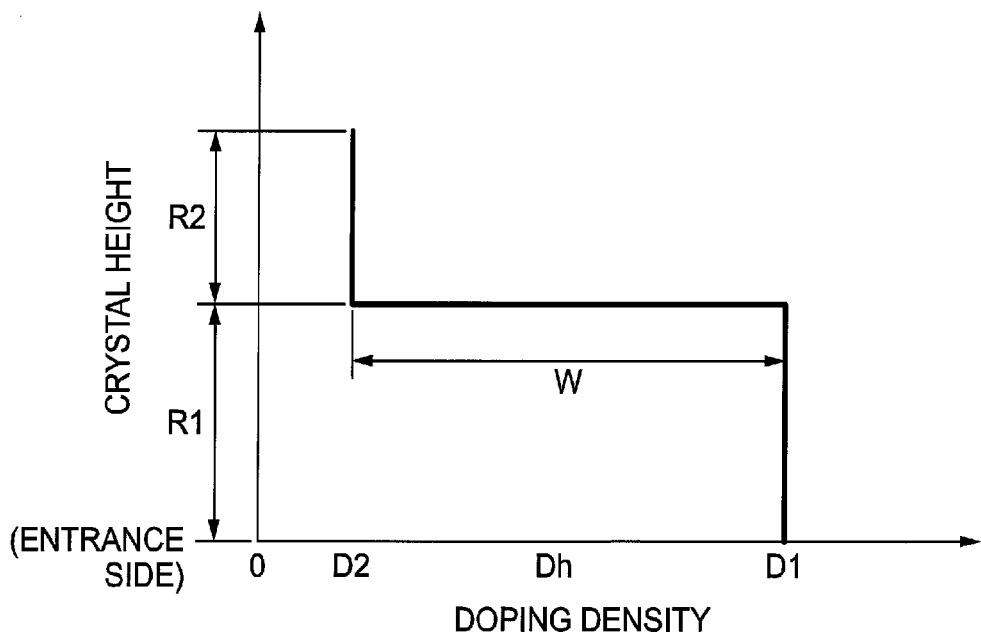
FIG. 6 is a graph showing doping density (activator density) relative to crystal height in a crystal growth direction in a scintillator.

As shown in FIG. 6, the doping density (activator density) of Tl added to the scintillator 200 has a variation in the height direction (thickness direction) of the scintillator 200. The doping density is higher in a region on the X-ray entrance side than in a region on the opposite side to the X-ray entrance side.

In the example of FIG. 6, the doping density varies in two stages D1 and D2 between one end side and the other end side in the crystal height direction. A first region R1 where the doping density is D1 is disposed in a position on the sensor board 400 side in the scintillator 200 as shown in FIG. 1. On the other hand, a second region R2 where the doping density is D2 is disposed in a position on the support 101 side in the scintillator 200 as shown in FIG. 1. That is, the first region R1 as a high activator density region where the doping density is higher (that is, the doping density is D1) than the doping density D2 in the second region R2 which is a region on the opposite side to the X-ray entrance side in the scintillator 200 is provided in a position on the X-ray entrance side in the scintillator 200. The doping density D2 may be zero. That is, the second region R2 may be formed out of CsI to which Tl is not added.

In the example of FIGS. 1 and 6, the thickness (size in the height direction of each columnar crystal 20A) of the region (first region R1) where the doping density is high is larger than the thickness of the region (second region R2) where the doping density is low. The relation between the thickness of the first region and the thickness of the second region is not limited thereto. The thickness of the first region R1 may be made as large as the thickness of the second region R2, or the thickness of the second region R2 may be larger than the thickness of the first region R1.

Here, the first and second regions R1 and R2 will be defined more specifically. The first region R1 is a region which has an activator density not lower than a doping density half-value (activator density half-value) Dh corresponding to ½ of a width (activator density variation width) W of variation of the doping density varying in the crystal growth direction of CsI. On the other hand, the second region R2 is a region which has a lower activator density than the doping density half-value Dh.

The first and second regions R1 and R2 merely exemplify a high activator density region and a region on the opposite side to the X-ray entrance side, respectively. The high activator density region and the region on the opposite side to the X-ray entrance side do not have to be recognized as regions halving the scintillator 200 in the height direction as indicated by the first and second regions R1 and R2. A plurality of regions with different activator densitys may be recognized.

[4. Operation and Effect of Doping Density]

According to the aforementioned X-ray image detection apparatus 1, the following operation and effect can be obtained.

Since the first region R1 which is a high activator density region with a high doping density is provided in a position on the X-ray entrance side and closely to the photodetector 40, X-rays which have been hardly attenuated immediately after transmitted through the sensor board 400 enter a region (serving as a main luminescence region) having a high doping density and a large amount of luminescence. That is, the distance between the sensor board 400 and the main luminescence region is so short that the effect of increasing the luminescence when the doping density is increased can be obtained to the utmost. Thus, fluorescence emitted by conversion of X-rays in the first region R1 can enter the photodetector 40 rapidly to increase the amount of light incident on the photodetector 40. When the amount of luminescence which can be utilized in the scintillator 200 can be increased thus, the first region R1 having a high activator density can be made thinner than that in a configuration where a region with a high activator density on the X-ray entrance side is not located closely to the photodetector 40. Thus, the usage of the activator which is expensive can be also reduced to reduce the cost.

In addition, generally, crystallinity is apt to be disordered with increase in doping density. When a region with a high doping density is located on the front end side of each columnar crystal 20A, the disorder of the crystallinity can be suppressed as compared with the case where the doping density is high in a position of an early part of growth in the columnar crystal 20A. Thus, the lowering of MTF can be suppressed.

If the doping density of the second region R2 on the support 101 side is high, the disorder of crystallinity in the second region R2 which is a region corresponding to an initial stage of deposition will give a severe effect to the crystallinity of the first region R1 which will grow later. Diffusion or absorption of light in the portion where the crystallinity is disordered leads to the lowering of MTF. In the configuration of the embodiment, on the other hand, the doping density on the support 101 side (second region R2) is low, and the doping density on the front end side of each columnar crystal 20A (first region R1) is high. Accordingly, each crystal can be grown while keeping its crystallinity, so that the light guide effect can be kept substantially in the whole of the columnar crystals 20A in the height direction. Thus, the lowering of MTF can be suppressed.

As described above, according to the X-ray image detection apparatus 1, the effect to increase the amount of luminescence in conformity to the increase of the doping density can be obtained and the disorder of crystallinity caused by the increase of the doping density can be prevented to suppress the lowering of MTF. According to the X-ray image detection apparatus 1, it is possible to detect an X-ray image with high sensitivity and high definition.

Figure 7:
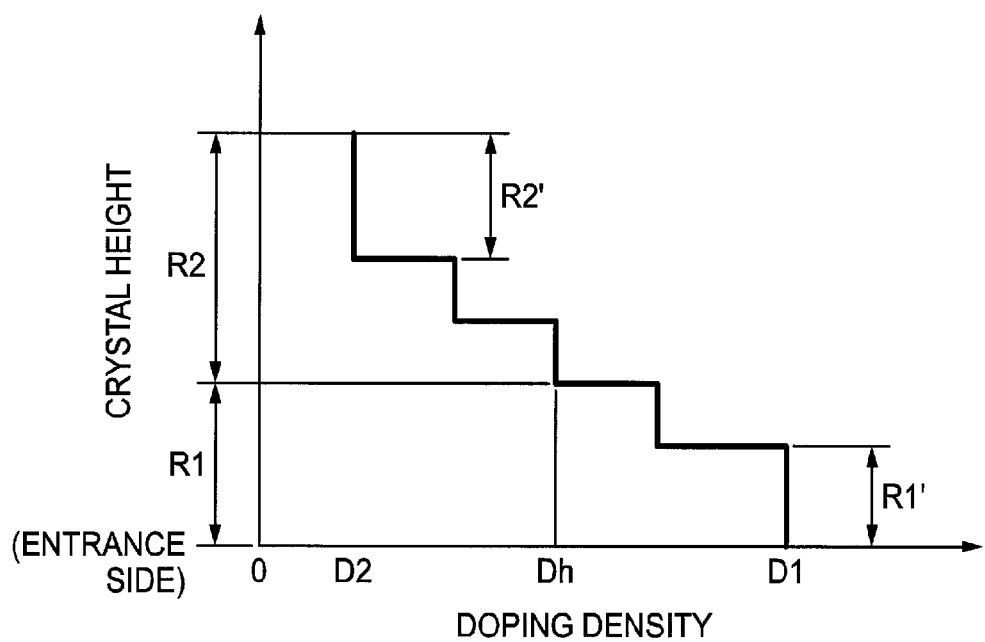
FIG. 7 is a graph showing another example of a change in doping density.

FIG. 7 shows another example of doping density in the scintillator 200. As shown in FIG. 7, the doping density may vary stepwise (discontinuously). FIG. 7 shows an example in which the scintillator is sectioned into a first region R1 as a high activator density region and a second region R2 as a region on the opposite side to the X-ray entrance side based on the doping density half-value Dh corresponding to the width of variation of the doping density in the crystal height direction.

Figure 8:
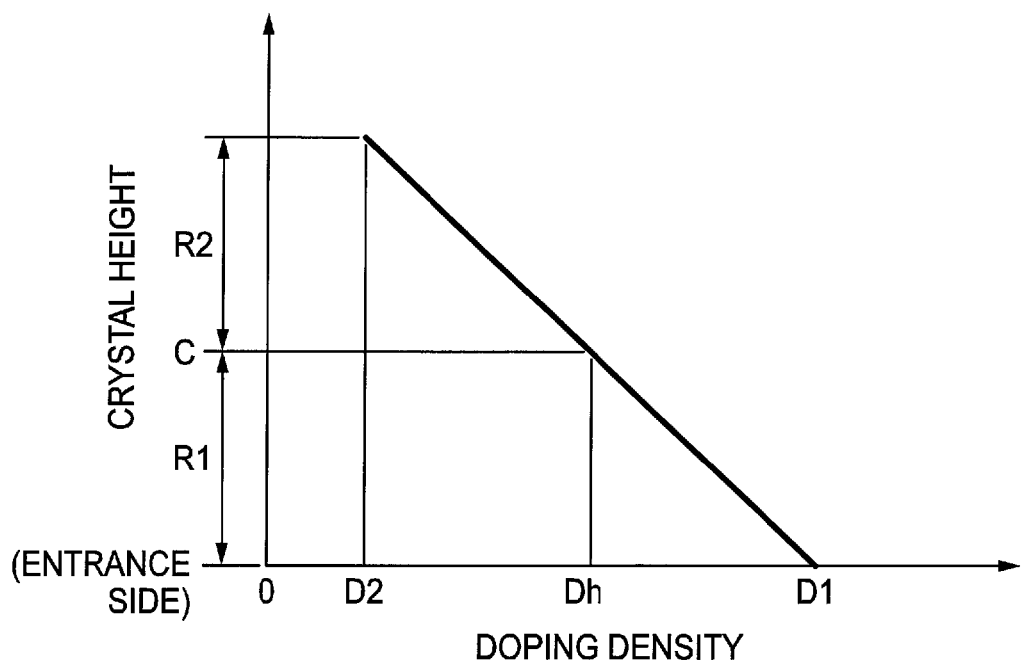
FIG. 8 is a graph showing another example of a change in doping density.

FIG. 8 shows another example of doping density in the scintillator 200. As shown in FIG. 8, the doping density may vary linearly and continuously. FIG. 8 shows an example in which the scintillator is sectioned into a first region R1 as a high activator density region and a second region R2 as a region on the opposite side to the X-ray entrance side based on the doping density half-value Dh. In FIGS. 7 and 8, the boundary between the high activator density region and the region on the opposite side to the X-ray entrance side may be set in any height position.

Also by the doping density distribution as shown in FIG. 7 or 8, a similar effect to the effect obtained by the X-ray image detection apparatus 1 described with reference to FIGS. 1 to 6 can be obtained.

[5. Method for Manufacturing X-Ray Image Detection Apparatus]

Next, description will be made on a method for manufacturing the aforementioned X-ray image detection apparatus.

It is preferable that the aforementioned scintillator 200 is formed on the surface of the support 101 by a vapor deposition method. Here, a mode in which CsI:Tl is used will be described by way of example.

The vapor deposition method will be described briefly. Under the environment with a degree of vacuum of 0.01 to 10 Pa, CsI as a host and Tl as an activator are heated and evaporated respectively, for example, in resistance heating crucibles to which electric power is applied. Thus, CsI:Tl is deposited on the support whose temperature is set at a room temperature (20° C.) to 300° C.

Here, the electric power applied to the Tl crucible is changed to change the heating temperature (deposition cell temperature) of Tl, or the degree of vacuum etc. is changed. In such a manner, it is possible to form a scintillator having first and second regions R1 and R2 with different doping densities (scintillator forming step). For example, when the electric power applied to the Tl crucible is increased, the doping density can be increased. When the electric power applied to the Tl crucible is decreased, the doping density can be decreased. Alternatively, the kind of activator may be changed to thallium sulfate, thallium oxide, thallium iodide, thallium carbonate or the like (Tl containing compound may be changed), to change the doping density. The change of the Tl containing compound and the change of the deposition cell temperature may be combined to change the doping density. Further, doping may be performed by ion implantation to change the doping density.

In addition, the crystal shape, the crystal diameter, the void ratio, etc. of the scintillator 200 can be controlled by changing the degree of vacuum, the temperature of the support, the rate of deposition, or the like.

After the scintillator 200 is formed on the support 101, the protective film 30 is formed by deposition using parylene or the like so as to seal off the scintillator 200 on the support 101. Thus, the scintillator panel 10 is manufactured. The protective film 30 does not have to be formed when moisture resistance is secured in the scintillator 200 by another method such as a moisture-resistant film for enclosing the scintillator panel 10 air-tightly and water-tightly.

The sensor board 400 is pasted to the scintillator panel 10 from the opposite side to the support 101 so as to be integrated therewith. By the pasting step performed thus, the X-ray image detection apparatus 1 can be obtained. The method for pasting the scintillator 200 and the sensor board 400 to each other is not limited particularly. Any other method may be used as long as the scintillator 200 and the sensor board 400 can be coupled optically. As the method for pasting the scintillator 200 and the sensor board 400 to each other, either a method for making the scintillator 200 and the sensor board 400 face each other and adhere to each other or a method for making the scintillator 200 and the sensor board 400 adhere to each other through a resin layer may be used.

[6. X-Ray Image Detection Apparatus in Another Mode]

Figure 9:
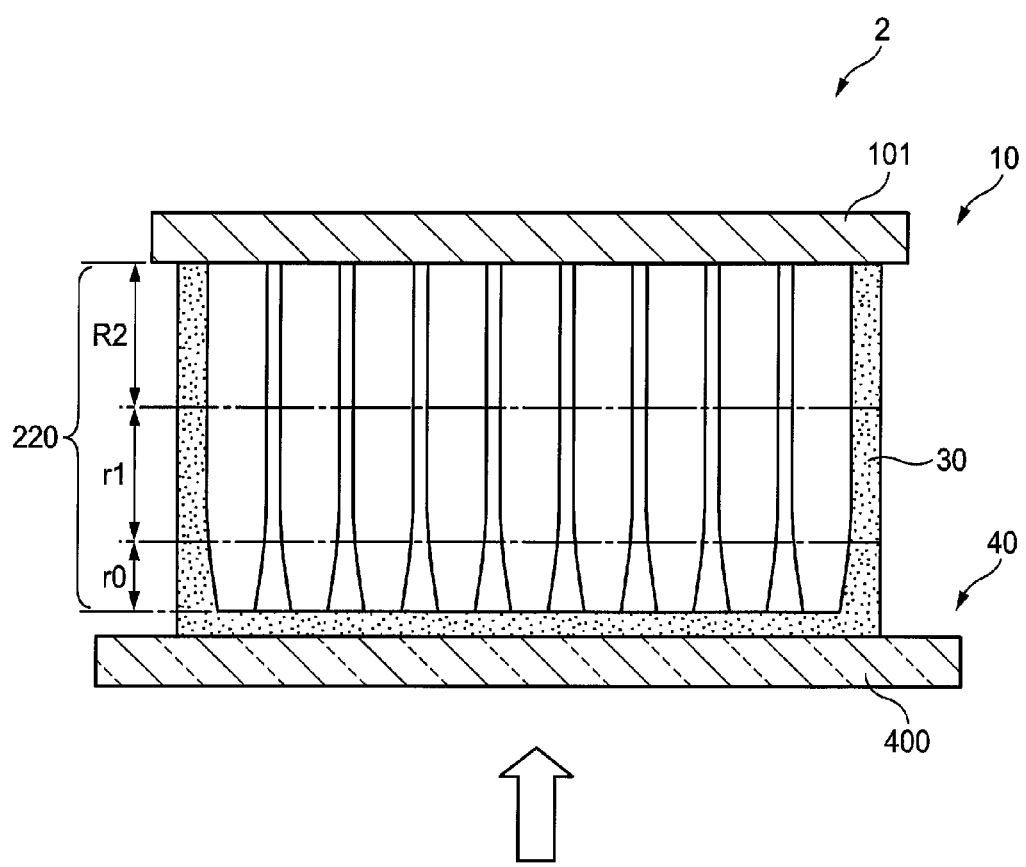
FIG. 9 is a side sectional view schematically showing the outline configuration of an X-ray image detection apparatus having a low activator density region.
Figure 10:
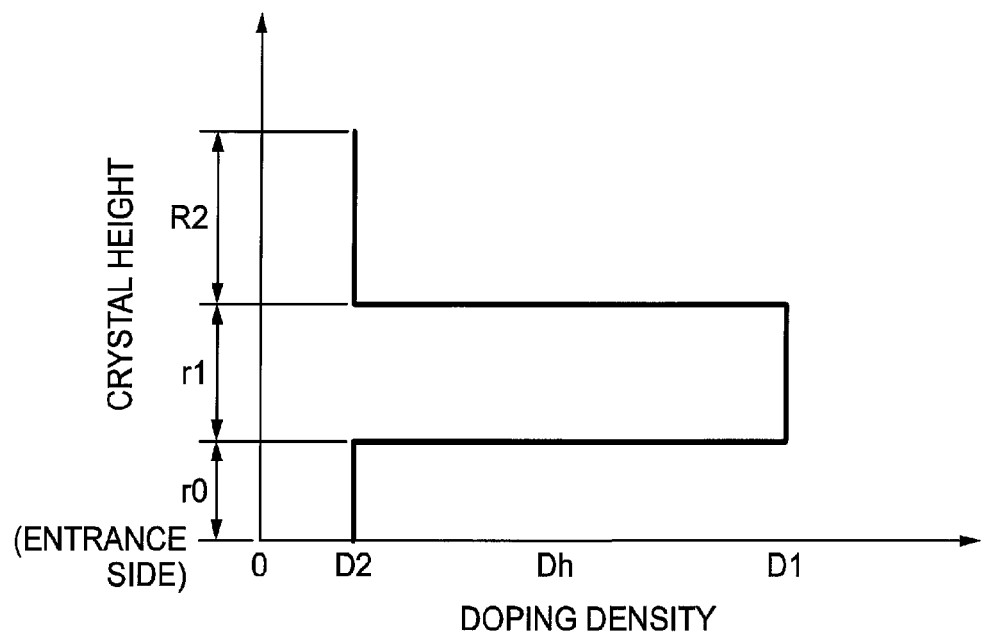
FIG. 10 is a graph showing doping density (activator density) relative to crystal height in a crystal growth direction in a scintillator.
Figure 11:
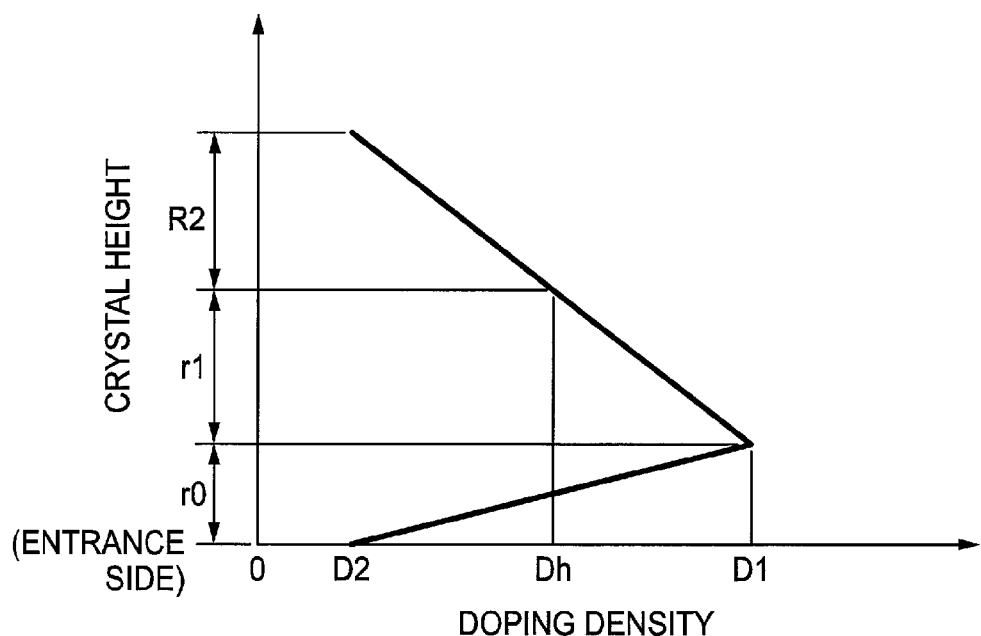
FIG. 11 is a graph showing another example of a change in doping density.

FIG. 9 shows another example of an X-ray image detection apparatus for explaining the embodiment of the invention. FIGS. 10 and 11 show a change in doping density in an X-ray image detection apparatus 2 in FIG. 9.

A scintillator 220 of the X-ray image detection apparatus 2 has a low activator density region r0 in a position close to the photodetector 40. The low activator density region r0 is provided on a side closer to the sensor board 400 than a first region r1. The doping density in the low activator density region r0 is lower than the doping density in the first region r1.

In the same manner as the aforementioned first region R1, the first region r1 is a high activator density region whose doping density is higher than the doping density of the second region R2 and which is provided on the X-ray entrance side in the scintillator 220. In addition, the first region r1 is formed in a region where the closest portion to the sensor board 400 is excluded from the region occupied by the aforementioned first region R1. That is, the doping density increased in the aforementioned first region R1 is decreased near the sensor board 400 due to formation of the low activator density region r0.

As shown in FIG. 10, doping density D2 in the low activator density region r0 is lower than doping density D1 in the first region r1. In the example of FIG. 10, the doping density D1 in the first region r1 is decreased discontinuously in the low activator density region r0. However, as shown in FIG. 11, the maximum doping density D1 in the first region r1 may be decreased continuously in the low activator density region r0.

In FIGS. 10 and 11, the doping density D2 may be zero. In addition, the doping density in the low activator density region r0 does not have to be D2 but be any value as long as the doping density in the low activator density region r0 is smaller than the doping density D1 in the first region r1.

When the low activator density region r0 is provided in a position closer to the sensor board 400 than the first region r1 as shown in the configuration of FIGS. 10 and 11, the effect to improve the strength of the scintillator 220 can be obtained in addition to the aforementioned effect of the first region to increase the amount of luminescence and to suppress the lowering of MTF. That is, while the increase of the doping density can increase the amount of luminescence as described above, the increase of the doping density leads to disorder of crystallinity to lower the strength of the portion where the crystallinity is disordered. Thus, there is a fear that the front end portions of the columnar crystals 20A may be damaged when the scintillator 220 is pasted to the sensor board 400 or when a load is applied to the scintillator panel. Therefore, the low activator density region r0 whose doping density has been reduced is provided in a position to adhere to the sensor board 400 so that strength can be secured in the front end portions of the columnar crystals 20A. In this manner, it is possible to increase a withstand load of the X-ray image detection apparatus to improve the shock resistance thereof. It is possible to obtain an effect that the scintillator 220 is hardly damaged even when receiving a load from a housing such as a cassette top plate particularly when the X-ray image detection apparatus is pasted to the housing.

In addition, CsI deteriorates in resistance to moisture absorption due to activation of Tl. For this reason, the performance of the scintillator begins to deteriorate when the sealing of the scintillator 220 with the protective film 30 and the sensor board 400 is lowered at the time of manufacturing or in use. In spite of the lowering of the sealing, the resistance to moisture absorption can be secured in the front end portion of the scintillator 220 due to the provision of the low activator density region r0 whose doping density is low. Thus, the deterioration of the scintillator performance can be suppressed (the deterioration can be delayed). It can be considered that the sealing deteriorates for the following reasons. That is, the protective film 30 is broken in the pasting step; the scintillator is broken due to the narrow front end portions of the columnar crystals 20A in other steps; or the protective film 30 is partially separated from the sensor board 400 at the time of shock to lower the moisture resistance at that portion. In addition, when the photoelectric conversion elements 41 and the switching devices 42 are separated from the substrate in use, moisture can be easily penetrated into the scintillator 220 through the switching devices 42 or the like. Even in such a case, the scintillator 220 can keep resistance to moisture absorption to suppress deterioration of the performance.

It is preferable that the low activator density region r0 is formed to be thick enough to be able to secure the strength corresponding to a load applied in the aforementioned pasting step and thin enough to be able to keep resistance to moisture absorption. The low activator density region r0 is preferably not thicker than 50 μm. When the low activator density region r0 is thin like this, attenuation and scattering of light in the low activator density region r0 is negligible. In addition, the low activator density region r0 is preferably not thinner than 5 μm in order to secure the strength.

Figure 12:
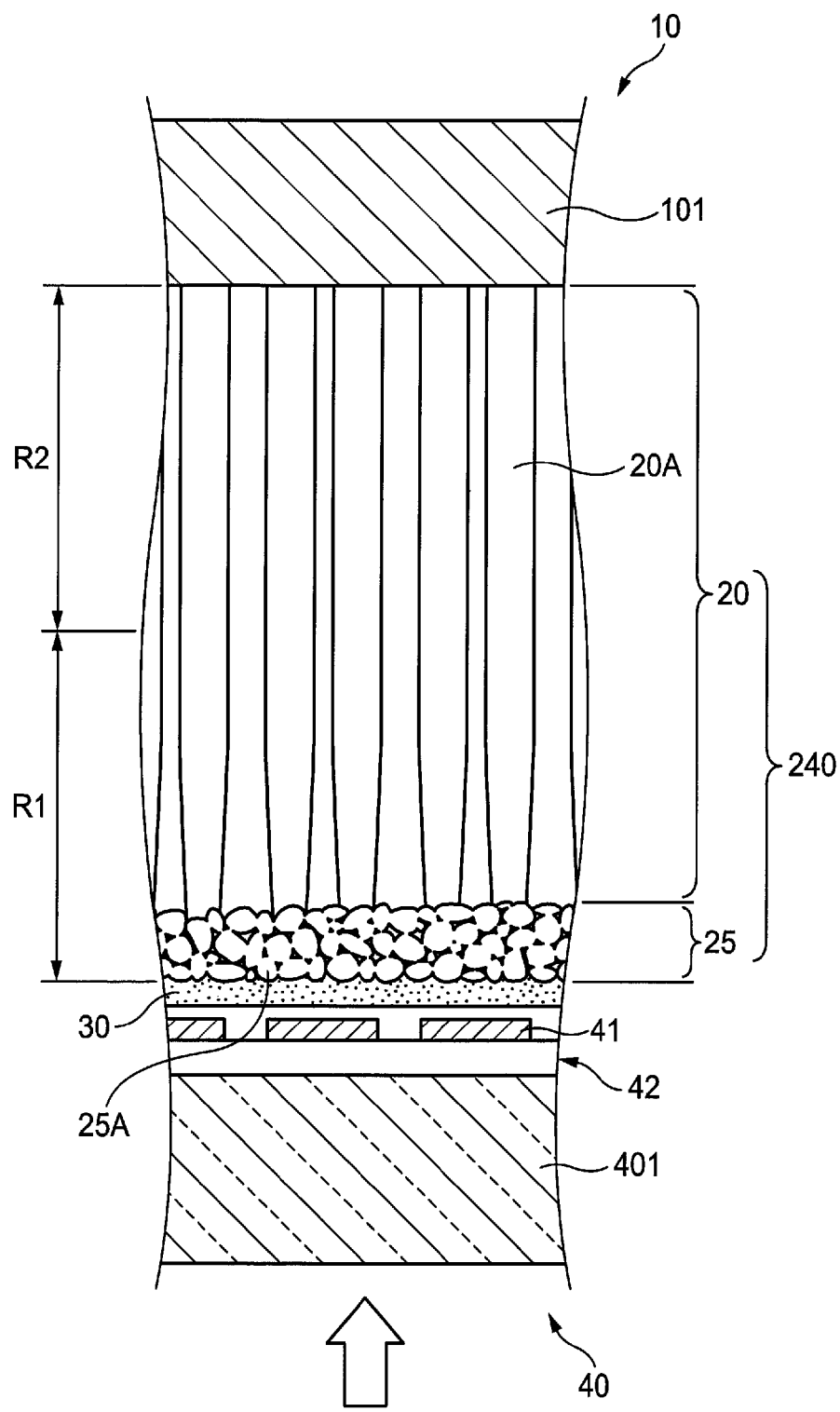
FIG. 12 is a side sectional view of a modification of the configuration of FIG. 4, schematically showing a scintillator panel having a non-columnar portion.

FIG. 12 shows another example of the X-ray image detection apparatus. A scintillator 240 shown in FIG. 12 is formed to include non-columnar crystals 25A provided at the front ends of the columnar crystals 20A. That is, when attention is paid to the crystal shape, it is noted that the scintillator 240 has a columnar portion 20 made up of a group of columnar crystals 20A, and a non-columnar portion 25 including an aggregate of a set of non-columnar crystals. On the other hand, when attention is paid to the doping density, it is noted that the scintillator 240 has a first region R1 as a high activator density region and a second region R2 as a region whose activator density is lower than that of the first region R1 and which is located on the opposite side to the X-ray entrance side.

After the columnar portion 20 is formed in the aforementioned scintillator manufacturing step, the non-columnar portion 25 may be formed in at least one of the following operations. That is, the degree of vacuum is decreased; the temperature of the support is lowered; or the rate of deposition is increased.

The configuration of the non-columnar portion 25 will be described in detail. The non-columnar portion 25 is formed to include non-columnar crystals 25A each of which has a substantially spherical shape or an indeterminate shape as shown in FIG. 12. The non-columnar portion 25 may include amorphous portions. In the non-columnar portion 25, the non-columnar crystals 25A whose diameters are smaller than the columnar crystals 20A in FIG. 5 are irregularly coupled with one other or laid on one another, so that distinct voids can be hardly recognized among the crystals.

It is preferable that the non-columnar portion 25 is not thinner than 3 μm and not thicker than 50 μm. It is preferable that the non-columnar portion 25 is not thinner than 3 μm, in order to surely cover the front end portion of the columnar portion 20 in the crystal growth direction (at least between the columnar crystals 20A and 20A) to thereby flatten the surface of the scintillator 240. On the other hand, when the non-columnar portion 25 having no light guide effect is too thick, light is mingled among pixels in the non-columnar portion 25 to produce blurring in an image easily. It is therefore preferable that the non-columnar portion 25 is not thicker than 50 μm.

In addition, the minimum thickness of the non-columnar portion 25 is sufficient as long as the non-columnar portion 25 can cover the front end portion of the columnar portion 20 surely. That is, if the thickness of the non-columnar portion 25 is reduced, the usage of the fluorescent material which is expensive can be reduced to reduce the cost.

Since the non-columnar portion 25 is thin, attenuation and scattering of light emitted from the columnar crystals 20A in the non-columnar portion 25 is negligible.

In accordance with manufacturing conditions etc., the non-columnar portion 25 may have a structure in which not a single layer but a plurality of layers are laminated. In such a case, the thickness of the non-columnar portion 25 corresponds to the thickness between the front end of each columnar crystal 20A in the crystal growth direction and the surface of the outermost layer of the non-columnar portion 25.

The void ratio of the non-columnar portion 25 is calculated based on the area of the non-columnar portion 25 in plan view, the thickness of the non-columnar portion 25, the density of CsI, the weight of the scintillator panel 10 measured actually, etc. The thus calculated void ratio of the non-columnar portion 25 as a whole in the thickness direction thereof is not higher than 10%, more preferably 0 or substantially 0.

That is, it is preferable that the non-columnar portion 25 is thin to prevent attenuation and scattering of light. Even when the non-columnar portion 25 is thin, it is preferable that the void ratio of the non-columnar portion 25 is low to cover the front end portion of the columnar portion 20 and flatten the scintillator 240. It is preferable that the void ratio of the non-columnar portion 25 is small in order to prevent the material of the protective film 30 from flowing into gaps between the columnar crystals 20A.

A size in a wide range may be used for each non-columnar crystal 25A of the non-columnar portion 25. It is preferable that the size of the non-columnar crystal 25A which has a substantially spherical shape is extremely small to make the void ratio close to zero in order to cover the front end of the columnar portion 20 with the non-columnar portion 25. In addition, in the same logic, it is preferable that the non-columnar crystals 25A are coupled with one another to increase the diameter to make the void ratio close to zero. Therefore, the crystal size in the non-columnar portion 25 may be determined suitably as long as the crystal size is not too large to secure flatness in the scintillator surface.

At least gaps between the columnar crystals 20A and 20A in the front end portion of the columnar portion 20 in the growth direction are covered with the non-columnar portion 25. Thus, a portion of the scintillator 240 facing the sensor board 400 is flattened without requiring any method easily causing thermal deformation of the support, for example, a method for controlling the temperature of the support during deposition. As a result, the protective film 30 is prevented from being broken by the front end portions of the columnar crystals 20A, so that air tightness can be secured with the protective film 30. Thus, the scintillator 240 can be prevented from deteriorating in performance due to deliquescence of the scintillator 240.

The aforementioned protective film 30 covers the flattened surface of the non-columnar portion 25. The scintillator 240 is made to adhere to the sensor board 400 through the protective film 30. As described above, the scintillator 240 is flattened sufficiently due to the low void ratio of the non-columnar portion 25. Thus, the adhesion is satisfactory.

Since the non-columnar portion 25 configured as described above is provided, the air gaps among the columnar crystals 20A are filled with the non-columnar portion 25 in the front end portion of the columnar portion 20. Thus, the strength of a sensor board 400 side portion in the scintillator 240 is improved. Due to the low void ratio of the non-columnar portion 25 as described above, the strength of the scintillator 240 is improved more greatly.

Due to improvement in the strength of the scintillator 240, strength against a load applied when the sensor board 400 and the scintillator panel are pasted to each other is secured in the scintillator 240. Due to the secured strength of the scintillator 240, the scintillator 240 and the sensor board 400 can be made to adhere to each other through the protective film 30 uniformly without causing any damage to the scintillator 240 even if the scintillator panel is pressed strongly against the sensor board. When there is unevenness in the adhesion between the scintillator 240 and the sensor board 400, unevenness appears in a detected image easily. However, the quality of the detected image can be made uniform without such unevenness.

Due to improvement in the aforementioned strength of the scintillator 240, shock resistance of the X-ray image detection apparatus can be improved. It is possible to obtain an effect that the scintillator 240 is hardly damaged even when receiving a load from a housing such as a cassette top plate particularly when the X-ray image detection apparatus is pasted to the housing.

In addition, due to improvement in the adhesion between the scintillator 240 and the sensor board 400, external force applied to the scintillator 240 in the shock of falling-down or the like can be cushioned by the sensor board 400 so that the shock resistance is improved also in view from this point. To secure the shock resistance in the X-ray image detection apparatus is important particularly when the X-ray image detection apparatus is configured as a portable cassette which is removably attached to an X-ray imaging system.

In addition to the above description, due to the secured adhesion to the sensor board 400, it is possible to prevent the scintillator 240 and the sensor board 400 form being separated from each other due to a difference in the coefficient of thermal expansion.

In addition, due to the non-columnar portion 25, the material such as parylene can be prevented from entering among the columnar crystals 20A when the protective film 30 is formed. When parylene or the like enters an air gap between adjacent columnar crystals 20A, a difference in refractive index between each of the columnar crystals 20A and a region between the columnar crystals 20A is reduced to increase the critical angle of light. Thus, the performance with which the columnar crystals 20A guide the light in the thickness direction deteriorates. Specifically, the light guide performance deteriorates from the condition that the refractive index of CsI is 1.8, the refractive index of the air is 1 and the critical angle is 34° to the condition that the refractive index of CsI is 1.8, the refractive index of parylene is 1.5 and the critical angle is 56°. Formation of the non-columnar portion 25 can prevent occurrence of such a problem.

Figure 13:
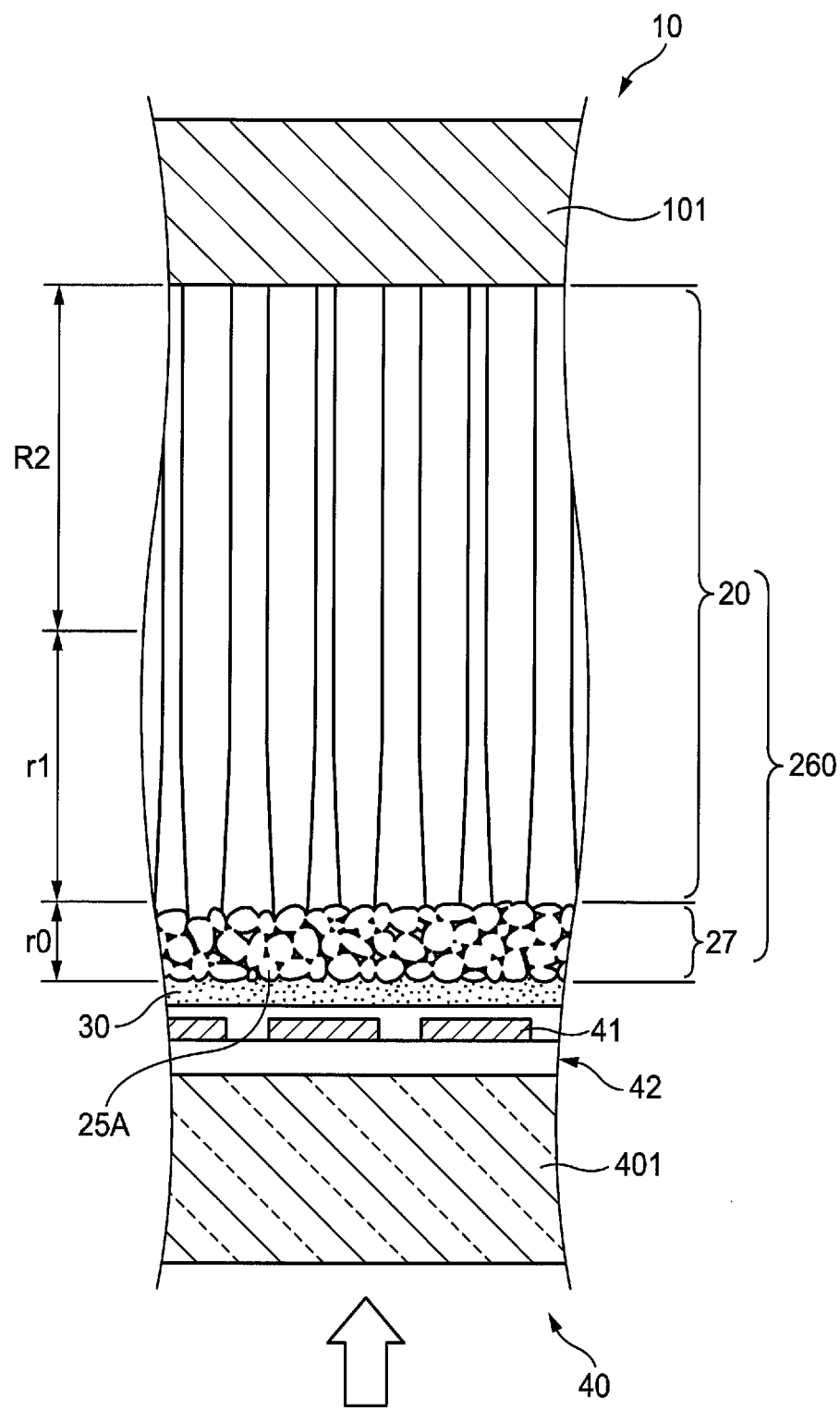
FIG. 13 is a side sectional view schematically showing a scintillator panel having a non-columnar portion which forms a low activator density region.

FIG. 13 shows another example of the X-ray image detection apparatus. In a scintillator 260 shown in FIG. 13, a low activator density region r0 is provided in a position closer to the sensor board 400 than a first region r1, and a non-columnar portion 27 forms the low activator density region r0. The doping density of the non-columnar portion 27 is lower than the doping density of the first region r1. That is, the heating temperature of Tl or the degree of vacuum is changed to reduce the doping density of the non-columnar portion 27 when the non-columnar portion 27 is formed in the aforementioned scintillator manufacturing step. When the doping density of the non-columnar portion 27 is made lower than the doping density of the non-columnar portion 25 shown in FIG. 12 in this manner, the crystallinity of the non-columnar portion 27 can be kept and lowering of the strength can be suppressed. Thus, due to the non-columnar portion 27, the strength can be improved more surely. In addition, when the doping density is reduced, the resistance to moisture absorption of the scintillator can be also improved.

Of light emitted by the scintillator, light travelling on the opposite side to the sensor board 400 is reflected toward the sensor board 400 so that the amount of the emitted light which can be utilized can be increased. In the configuration shown in FIG. 1 and so on, light is reflected by the support 101 made from Al or the like. However, a reflective layer may be formed in the scintillator. For example, a second non-columnar portion including non-columnar crystals is formed on the opposite side (that is, the support 101 side) of the columnar portion 20 to the sensor board 400, so that reflective characteristic can be given to the scintillator. When such a second non-columnar portion is interposed between the support 101 and the columnar portion 20, the columnar crystals 20A can be grown with good crystallinity on the second non-columnar portion as a base, and the scintillator can be prevented from being easily separated from the support even if heat is propagated from a control module to the scintillator.

[7. Available Device Material]

[7-1. OPC (Organic Photoelectric Conversion) Material]

For example, any OPC (Organic Photoelectric Conversion) material disclosed in JP-A-2009-32854 can be used for the aforementioned photoelectric conversion elements 41 (FIG. 2). A film formed out of the OPC material (hereinafter referred to as OPC film) can be used as the photoconductive layer 410 of the photoelectric conversion elements 41. The OPC film contains an organic photoelectric conversion material, which absorbs light emitted from the scintillator and generates electric charges corresponding to the absorbed light. Thus, the OPC film containing the organic photoelectric conversion material has a sharp absorption spectrum in a visible light range. Electromagnetic waves other than the light emitted by the scintillator are hardly absorbed by the OPC film. Thus, noise generated by radioactive rays such as X-rays absorbed by the OPC film can be suppressed effectively.

It is preferable that the absorption peak wavelength of the organic photoelectric conversion material forming the OPC film is closer to the peak wavelength of light emitted by the scintillator in order to more efficiently absorb the light emitted by the scintillator. Ideally, the absorption peak wavelength of the organic photoelectric conversion material agrees with the peak wavelength of the light emitted by the scintillator. However, if the difference between the absorption peak wavelength of the organic photoelectric conversion material and the peak wavelength of the light emitted by the scintillator is small, the light emitted by the scintillator can be absorbed satisfactorily. Specifically, the difference between the absorption peak wavelength of the organic photoelectric conversion material and the peak wavelength of the light emitted by the scintillator in response to radioactive rays is preferably not larger than 10 nm, more preferably not larger than 5 nm.

Examples of the organic photoelectric conversion material that can satisfy such conditions include arylidene-based organic compounds, quinacridone-based organic compounds, and phthalocyanine-based organic compounds. For example, the absorption peak wavelength of quinacridone in a visible light range is 560 nm. Therefore, when quinacridone is used as the organic photoelectric conversion material and CsI(Tl) is used as the scintillator material, the aforementioned difference in peak wavelength can be set within 5 nm so that the amount of electric charges generated in the OPC film can be increased substantially to the maximum.

At least a part of an organic layer provided between the bias electrode 411 and the charge collection electrode 412 can be formed out of an OPC film. More specifically, the organic layer can be formed out of a stack or a mixture of a portion for absorbing electromagnetic waves, a photoelectric conversion portion, an electron transport portion, an electron hole transport portion, an electron blocking portion, an electron hole blocking portion, a crystallization prevention portion, electrodes, interlayer contact improvement portions, etc.

Preferably the organic layer contains an organic p-type compound or an organic n-type compound. An organic p-type semiconductor (compound) is a donor-type organic semiconductor (compound) as chiefly represented by an electron hole transport organic compound, meaning an organic compound having characteristic to easily donate electrons. More in detail, of two organic materials used in contact with each other, one with lower ionization potential is called the donor-type organic compound. Therefore, any organic compound may be used as the donor-type organic compound as long as the organic compound having characteristic to donate electrons. Examples of the donor-type organic compound that can be used include a triarylamine compound, a benzidine compound, a pyrazoline compound, a styrylamine compound, a hydrazone compound, a triphenylmethane compound, a carbazole compound, a polysilane compound, a thiophene compound, a phthalocyanine compound, a cyanine compound, a merocyanine compound, an oxonol compound, a polyamine compound, an indole compound, a pyrrole compound, a pyrazole compound, a polyarylene compound, a fused aromatic carbocyclic compound (naphthalene derivative, anthracene derivative, phenanthrene derivative, tetracene derivative, pyrene derivative, perylene derivative, fluoranthene derivative), a metal complex having a nitrogen-containing heterocyclic compound as a ligand, etc. The donor-type organic semiconductor is not limited thereto but any organic compound having lower ionization potential than the organic compound used as an n-type (acceptor-type) compound may be used as the donor-type organic semiconductor.

The n-type organic semiconductor (compound) is an acceptor-type organic semiconductor (compound) as chiefly represented by an electron transport organic compound, meaning an organic compound having characteristic to easily accept electrons. More specifically, when two organic compounds are used in contact with each other, one of the two organic compounds with higher electron affinity is the acceptor-type organic compound. Therefore, any organic compound may be used as the acceptor-type organic compound as long as the organic compound having characteristic to accept electrons. Examples thereof include a fused aromatic carbocyclic compound (naphthalene derivative, anthracene derivative, phenanthrene derivative, tetracene derivative, pyrene derivative, perylene derivative, fluoranthene derivative), a 5- to 7-membered heterocyclic compound containing a nitrogen atom, an oxygen atom or a sulfur atom (e.g. pyridine, pyrazine, pyrimidine, pyridazine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridazine, triazolopyrimidine, tetrazaindene, oxadiazole, imidazopyridine, pyralidine, pyrrolopyridine, thiadiazolopyridine, dibenzazepine, tribenzazepine etc.), a polyarylene compound, a fluorene compound, a cyclopentadiene compound, a silyl compound, and a metal complex having a nitrogen-containing heterocyclic compound as a ligand. The acceptor-type organic semiconductor is not limited thereto. Any organic compound may be used as the acceptor-type organic semiconductor as long as the organic compound has higher electron affinity than the organic compound used as the donor-type organic compound.

As for p-type organic dye or n-type organic dye, any known dye may be used. Preferred examples thereof include cyanine dyes, styryl dyes, hemicyanine dyes, merocyanine dyes (including zero-methine merocyanine (simple merocyanine)), trinuclear merocyanine dyes, tetranuclear merocyanine dyes, rhodacyanine dyes, complex cyanine dyes, complex merocyanine dyes, alopolar dyes, oxonol dyes, hemioxonol dyes, squarylium dyes, croconium dyes, azamethine dyes, coumarin dyes, arylidene dyes, anthraquinone dyes, triphenylmethane dyes, azo dyes, azomethine dyes, spiro compounds, metallocene dyes, fluorenone dyes, flugide dyes, perylene dyes, phenazine dyes, phenothiazine dyes, quinone dyes, indigo dyes, diphenylmethane dyes, polyene dyes, acridine dyes, acridinone dyes, diphenylamine dyes, quinacridone dyes, quinophthalone dyes, phenoxazine dyes, phthaloperylene dyes, porphyrin dyes, chlorophyll dyes, phthalocyanine dyes, metal complex dyes, and fused aromatic carbocyclic dyes (naphthalene derivative, anthracene derivative, phenanthrene derivative, tetracene derivative, pyrene derivative, perylene derivative, fluoranthene derivative).

A photoelectric conversion film (photosensitive layer) which has a layer of a p-type semiconductor and a layer of an n-type semiconductor between a pair of electrodes and at least one of the p-type semiconductor and the n-type semiconductor is an organic semiconductor and in which a bulk heterojunction structure layer including the p-type semiconductor and the n-type semiconductor is provided as an intermediate layer between those semiconductor layers may be used preferably. The bulk heterojunction structure layer included in the photoelectric conversion film can cover the defect that the carrier diffusion length of the organic layer is short. Thus, the photoelectric conversion efficiency can be improved. The bulk heterojunction structure has been described in detail in JP-A-2005-303266.

It is preferable that the photoelectric conversion film is thicker in view of absorption of light from the scintillator. The photoelectric conversion film is preferably not thinner than 30 nm and not thicker than 300 nm, more preferably not thinner than 50 nm and not thicker than 250 nm, particularly more preferably not thinner than 80 nm and not thicker than 200 nm in consideration of the ratio which does make any contribution to separation of electric charges.

As for any other configuration about the aforementioned OPC film, for example, refer to description in JP-A-2009-32854.

[7-2. Organic TFT (Thin Film Transistor)]

Although inorganic materials are often used for the aforementioned TFT switching devices 42, organic materials may be used, for example, as disclosed in JP-A-2009-212389. Organic TFT may have any type of structure but a field effect transistor (FET) structure is the most preferable. In the FET structure, a substrate is disposed in the bottom layer, and a gate electrode is provided partially an upper surface of the substrate. An insulator layer is provided to cover the electrode and touch the substrate in the other portion than the electrode. Further, a semiconductor active layer is provided on an upper surface of the insulator layer, and a source electrode and a drain electrode are disposed partially on the upper surface of the semiconductor active layer and at a distance from each other. This configuration is called a top contact type device. A bottom contact type device in which a source electrode and a drain electrode are disposed under a semiconductor active layer may be also used preferably. In addition, a vertical transistor structure in which a carrier flows in the thickness direction of an organic semiconductor film may be used.

(Semiconductor Active Layer)

A p-type organic semiconductor material is used as the material of the semiconductor active layer. The p-type organic semiconductor material is substantially colorless and transparent. For example, the thickness of the organic semiconductor thin film may be measured by a stylus thickness meter. A plurality of thin films with different thicknesses may be manufactured and their absorption spectra may be measured so that the maximum absorbance per film thickness of 30 nm can be obtained by conversion based on a calibration curve.

Organic semiconductor materials mentioned herein are organic materials showing properties as semiconductors. Examples of the organic semiconductor materials include p-type organic semiconductor materials (or referred to as p-type materials simply or as electron hole transport materials) which conduct electron holes (holes) as carriers, and n-type organic semiconductor materials (or referred to as n-type materials simply or as electrode transport materials) which conduct electrons as carriers, similarly to a semiconductor formed out of an inorganic material. Of the organic semiconductor materials, lots of p-type materials generally show good properties. In addition, p-type transistors are generally excellent in operating stability as transistors under the atmosphere. Here, description here will be made on a p-type organic semiconductor material.

One of properties of organic thin film transistors is a carrier mobility (also referred to as mobility simply) μ which indicates the mobility of a carrier in an organic semiconductor layer. Although preferred mobility varies in accordance with applications, higher mobility is generally preferred. The mobility is preferably not lower than $1.0*10^{-7}$ cm$^2$/Vs, more preferably not lower than $1.0*10^{-6}$ cm$^2$/Vs, further preferably not lower than $1.0*10^{-5}$ cm$^2$/Vs. The mobility can be obtained by properties or TOF (Time Of Flight) measurement when the field effect transistor (FET) device is manufactured.

The p-type organic semiconductor material may be either a low molecular weight material or a high molecular weight material, but preferably a low molecular weight material. Lots of low molecular weight materials typically show excellent properties due to easiness in high purification because various refining processes such as sublimation refining, recrystallization, column chromatography, etc. can be applied thereto, or due to easiness in formation of a highly ordered crystal structure because the low molecular weight materials have a fixed molecular structure. The molecular weight of the low molecular weight material is preferably not lower than 100 and not higher than 5,000, more preferably not lower than 150 and not higher than 3,000, further more preferably not lower than 200 and not higher than 2,000.

Preferred specific examples of such a p-type organic semiconductor material will be shown. Bu represents a butyl group, Pr represents a propyl group, Et represents an ethyl group, and Ph represents a phenyl group.

[Chemical 1]

Compound 1 to 15

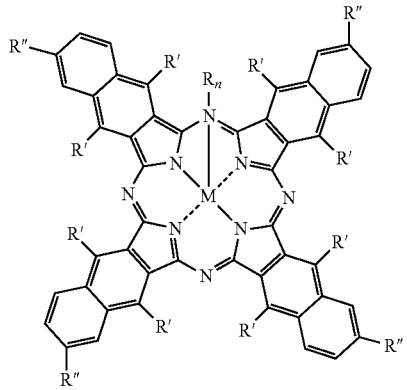

Compound 16 to 20

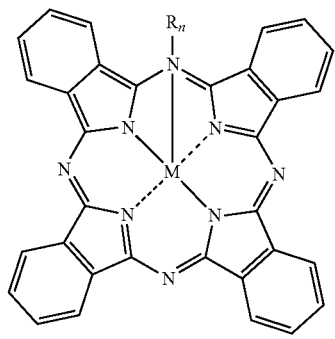

| Compound | M | R | n | R' | R" |
|---|---|---|---|---|---|
| 1 | Si | OSi(n-Bu)$_3$ | 2 | H | H |
| 2 | Si | OSi(i-Pr)$_3$ | 2 | H | H |
| 3 | Si | OSi(OEt)$_3$ | 2 | H | H |
| 4 | Si | OSiPh$_3$ | 2 | H | H |
| 5 | Si | O(n-C$_8$H$_{17}$) | 2 | H | H |
| 7 | Ge | OSi(n-Bu)$_3$ | 2 | H | H |
| 8 | Sn | OSi(n-Bu)$_3$ | 2 | H | H |
| 9 | Al | OSi(n-C$_6$H$_{13}$)$_3$ | 1 | H | H |
| 10 | Ga | OSi(n-C$_6$H$_{13}$)$_3$ | 1 | H | H |
| 11 | Cu | — | — | O(n-Bu) | H |
| 12 | Ni | — | — | O(n-Bu) | H |
| 13 | Zn | — | — | H | t-Bu |
| 14 | V=O | — | — | H | t-Bu |
| 15 | H$_2$ | — | — | H | t-Bu |
| 16 | Si | OSiEt$_3$ | 2 | — | — |
| 17 | Ge | OSiEt$_3$ | 2 | — | — |
| 18 | Sn | OSiEt$_3$ | 2 | — | — |
| 19 | Al | OSiEt$_3$ | 1 | — | — |
| 20 | Ga | OSiEt$_3$ | 1 | — | — |

(Device Constituent Materials Other Than Semiconductor Active Layer)

Description will be made below on device constituent materials other than the semiconductor active layer in the organic thin film transistor. The visible-light or infrared-light transmittance of each of those materials is preferably not lower than 60%, more preferably not lower than 70%, further more preferably not lower than 80%.

The substrate is not limited particularly as long as it has required smoothness. Examples of the substrate include glass, quartz, light transmissive plastic film, etc. Examples of the light transmissive plastic film include films or the like, made from polyethylene terephthalate (PET), polyethylene naphthalate (PEN), polyether sulfone (PES), polyether imide, polyetheretherketone, polyphenylene sulfide, polyalylate, polyimide, polycarbonate (PC), cellulose triacetate (TAC), cellulose acetate propionate (CAP), etc. In addition, any organic or inorganic filler may be contained in these plastic films. A flexible substrate formed out of aramid, bionanofiber, or the like may be used preferably as the substrate.

The material forming the gate electrode, the source electrode or the drain electrode is not limited especially if it has required electric conductivity. Examples thereof include electrically conductive oxides such as ITO (indium-doped tin oxide), IZO (indium-doped zinc oxide), SnO$_2$, ATO (antimony-doped tin oxide), ZnO, AZO (aluminum-doped zinc oxide), GZO (gallium-doped zinc oxide), TiO$_2$, FTO (fluorine-doped tin oxide), etc., electrically conductive polymers such as PEDOT/PSS (poly(3,4-ethylenedioxythiophene)/polystyrenesulfonate), carbon materials such as carbon nanotube, etc. These electrode materials may be formed into films, for example, by a method such as a vacuum deposition method, sputtering, a solution application method, etc.

The material used for the insulating layer is not limited particularly as long as it has required insulating effect. Examples thereof include inorganic materials such as silicon dioxide, silicon nitride, alumina, etc., and organic materials such as polyester, (PEN (polyethylene naphthalate), PET (polyethylene terephthalate) etc.), polycarbonate, polyimide, polyamide, polyacrylate, epoxy resin, polyparaxylylene resin, novolak resin, PVA (polyvinyl alcohol), PS (polystyrene), etc. These insulating film materials may be formed into films, for example, by a method such as a vacuum deposition method, sputtering, a solution application method, etc.

As for any other configuration about the aforementioned organic TFT, for example, refer to description in JP-A-2009-212389.

[7-3. Amorphous Oxide Semiconductor]

For example, amorphous oxide disclosed in JP-A-2010-186860 may be used for the aforementioned TFT switching devices 42. Here, description will be made on an amorphous oxide containing active layer of a FET transistor disclosed in JP-A-2010-186860. The active layer serves as a channel layer of the FET transistor where electrons or holes move.

The active layer has a configuration containing an amorphous oxide semiconductor. The amorphous oxide semiconductor can be formed into a film at a low temperature. Thus, the amorphous oxide semiconductor is formed preferably on a flexible substrate.

The amorphous oxide semiconductor used for the active layer is preferably amorphous oxide containing at least one kind of element selected from a group consisting of In, Sn, Zn and Cd, more preferably amorphous oxide containing at least one kind of element selected from a group consisting of In, Sn and Zn, further preferably amorphous oxide containing at least one kind of element selected from a group consisting of In and Zn.

Specific examples of the amorphous oxide used for the active layer include In$_2$O$_3$, ZnO, SnO$_2$, CdO, Indium-Zinc-Oxide (IZO), Indium-Tin-Oxide (ITO), Gallium-Zinc-Oxide (GZO), Indium-Gallium-Oxide (IGO), and Indium-Gallium-Zinc-Oxide (IGZO).

It is preferable that a vapor phase film formation method targeting at a polycrystal sinter of the oxide semiconductor is used as a method for forming the active layer. Of vapor phase film formation methods, a sputtering method or a pulse laser deposition (PLD) method is preferred. Further, the sputtering method is preferred in view from mass productivity. For example, the active layer is formed by an RF magnetron sputtering deposition method with a controlled degree of vacuum and a controlled flow rate of oxygen.

The thus formed active layer is confirmed to be an amorphous film by a well-known X-ray diffraction method. The composition ratio of the active layer is obtained by an RBS (Rutherford Backscattering Spectrometry) method.

In addition, the electric conductivity of the active layer is preferably lower than $10^2$ Scm$^{-1}$ and not lower than $10^{-4}$ Scm$^{-1}$, more preferably lower than $10^2$ Scm$^{-1}$ and not lower than $10^{-1}$ Scm$^{-1}$. Examples of the method for adjusting the electric conductivity of the active layer include a known adjusting method using oxygen defect, an adjusting method using a composition ratio, an adjusting method using impurities, and an adjusting method using an oxide semiconductor material.

As for any other configuration about the aforementioned amorphous oxide, for example, refer to description in JP-A-2010-186860.

[7-4. Flexible Material]

It may be considered that aramid, bionanofiber, etc. having properties such as flexibility, low thermal expansion and high strength, which cannot be obtained in existing glass or plastic, are used in a radiological image detection apparatus.

(1) Aramid

A film (or a sheet or a substrate) formed out of aramid which is a flexible material may be used as the insulating substrate 401 of the aforementioned sensor board, the support 101, the circuit board of the control module, or the like. An aramid material has high heat resistance showing a glass transition temperature of 315° C., high rigidity showing a Young's modulus of 10 GPa, and high dimensional stability showing a thermal expansion coefficient of −3 to 5 ppm/° C. Therefore, when a film made from aramid is used, it is possible to easily form a high-quality film for a semiconductor layer or a scintillator, as compared with the case where a general resin film is used. In addition, due to the high heat resistance of the aramid material, a transparent electrode material can be cured at a high temperature to have low resistance. Further, it is also possible to deal with automatic mounting with ICs, including a solder reflow step. Furthermore, since the aramid material has a thermal expansion coefficient close to that of ITO (indium tin oxide), a gas barrier film or a glass substrate, warp after manufacturing is small. In addition, cracking hardly occurs. Here, it is preferable to use a halogen-free (in conformity with the requirements of JPCA-ES01-2003) aramid material containing no halogens, in view of reduction of environmental load.

The aramid film may be laminated with a glass substrate or a PET substrate, or may be pasted onto a housing of a device.

High intermolecular cohesion (hydrogen bonding force) of aramid leads to low solubility to a solvent. When the problem of the low solubility is solved by molecular design, an aramid material easily formed into a colorless and transparent thin film can be used preferably. Due to molecular design for controlling the order of monomer units and the substituent species and position on an aromatic ring, easy formation with good solubility can be obtained with the molecular structure kept in a bar-like shape with high linearity leading to high rigidity or dimensional stability of the aramid material. Due to the molecular design, halogen-free can be also achieved.

In addition, an aramid material having an optimized characteristic in an in-plane direction of a film can be used preferably. Tensional conditions are controlled in each step of solution casting, vertical drawing and horizontal drawing in accordance with the strength of the aramid film which varies constantly during casting. Due to the control of the tensional conditions, the in-plane characteristic of the aramid film which has a bar-like molecular structure with high linearity leading to easy occurrence of anisotropic physicality can be balanced.

Specifically, in the solution casting step, the drying rate of the solvent is controlled to make the in-plane thickness-direction physicality isotropic and optimize the strength of the film including the solvent and the peel strength from a casting drum. In the vertical drawing step, the drawing conditions are controlled precisely in accordance with the film strength varying constantly during drawing and the residual amount of the solvent. In the horizontal drawing, the horizontal drawing conditions are controlled in accordance with a change in film strength varying due to heating and controlled to relax the residual stress of the film. By use of such an aramid material, the problem that the aramid film after casting may be curled.

In each of the contrivance for the easiness of casting and the contrivance for the balance of the film in-plane characteristic, the bar-like molecular structure with high linearity peculiar to aramid can be kept to keep the thermal expansion coefficient low. When the drawing conditions during film formation are changed, the thermal expansion coefficient can be reduced further.

(2) Bionanofiber

Components sufficiently small relative to the wavelength of light produce no scattering of the light. Accordingly, a flexible plastic material, or the like, reinforced by nanofibers may be used preferably in the insulating substrate 401 of the aforementioned sensor board, the support 101, the circuit board of the control module, or the like. Of the nanofibers, a composite material (occasionally referred to as bionanofiber) of bacterial cellulose and transparent resin can be used preferably. The bacterial cellulose is produced by bacteria (Acetobacter Xylinum). The bacterial cellulose has a cellulose microfibril bundle width of 50 nm, which is about ¹⁄₁₀ as large as the wavelength of visible light. In addition, the bacterial cellulose is characterized by high strength, high elasticity and low thermal expansion.

When a bacterial cellulose sheet is impregnated with transparent resin such as acrylic resin or epoxy resin and hardened, transparent bionanofiber showing a light transmittance of about 90% in a wavelength of 500 nm while having a high fiber ratio of about 60 to 70% can be obtained. By the bionanofiber, a thermal expansion coefficient (about 3 to 7 ppm) as low as that of silicon crystal, strength (about 460 MPa) as high as that of steel, and high elasticity (about 30 GPa) can be obtained.

As for the configuration about the aforementioned bionanofiber, for example, refer to description in JP-A-2008-34556.

The aforementioned X-ray image detection apparatus 1 can be incorporated and used in various systems such as a medical X-ray imaging system. Particularly, the X-ray image detection apparatus 1 in this example having characteristics of high sensitivity and high definition can be preferably used in mammography equipment required to detect a sharp image with a low dose of radiation.

In addition to the medical X-ray imaging system, for example, the X-ray image detection apparatus 1 is also applicable to an industrial X-ray imaging system for nondestructive inspection, or a system for detecting particle rays (α-rays, β-rays, γ-rays) other than electromagnetic waves. The X-ray image detection apparatus 1 has a wide range of applications.

[8. Disclosure of Specification]

It is disclosed a radiological image detection apparatus including: a scintillator which is formed out of a group of columnar crystals in which crystals of a fluorescent material emitting fluorescence when irradiated with radiation have grown into columnar shapes; and a photodetector which is provided on a radiation entrance side of the scintillator and which detects the fluorescence emitted by the scintillator as an electric signal. A high activator density region whose activator density is higher than activator density of a region on an opposite side to the radiation entrance side in the scintillator is provided and disposed on the photodetector side in the scintillator.

In the radiological image detection apparatus, the scintillator may be pasted onto the photodetector; and a low activator density region whose activator density may be lower than the activator density of the high activator density region is provided in a position closer to the photodetector than the high activator density region in the scintillator.

In the radiological image detection apparatus, a non-columnar portion including non-columnar crystals may be provided in a position closer to the photodetector than the high activator density region in the scintillator.

In the radiological image detection apparatus, activator density in the non-columnar portion may be lower than the activator density in the high activator density region.

In the radiological image detection apparatus, a void ratio of the non-columnar portion may be zero or substantially zero.

In the radiological image detection apparatus the non-columnar portion may be not thinner than 3 μm and not thicker than 50 μm.

In the radiological image detection apparatus, the scintillator may adhere to the photodetector.

In the radiological image detection apparatus, a host of the fluorescent material may be CsI, and an activator is Tl.

In the radiological image detection apparatus, the activator density of the region on the opposite side may be zero or substantially zero.

In the radiological image detection apparatus, activator density of the scintillator may vary stepwise from the high activator density region toward the region on the opposite side.

In the radiological image detection apparatus, activator density of the scintillator may vary linearly and continuously from the high activator density region toward the region on the opposite side.

In the radiological image detection apparatus, activator density of the scintillator may decreases discontinuously from the high activator density region toward the low activator density region.

In the radiological image detection apparatus, activator density of the scintillator may decrease continuously from the high activator density region toward the low activator density region.

In the radiological image detection apparatus, the activator density of the low activator density region may be zero or substantially zero.

In the radiological image detection apparatus, the activator density of the low activator density region may be different from the activator density of the region on the opposite side.

In the radiological image detection apparatus, the low activator density region may be not thinner than 5 μm and not thicker than 50 μm.

The radio logical image detection apparatus may further includes: a protective film which covers and sealing the scintillator.

In the radiological image detection apparatus, the activator density in the high activator density region may be higher than an activator density half-value which is an activator density corresponding to ½ of a width of variation of the doping density varying in a crystal growth direction of the fluorescent material; and activator density in the region on the opposite side to the radiation entrance side may be lower than the activator density half-value.

Also, it is disclosed a method for manufacturing the radiological image detection apparatus including: forming the scintillator by a vapor deposition method with changing at least of one of conditions of activator heating temperature, vacuum degree, support temperature and deposition rate.

The method for manufacturing the radiological image detection apparatus, may further include: pasting the photodetector integrally with the scintillator formed on a support, from an opposite side to the support.

What is claimed is:

1. A radiological image detection apparatus comprising:
a scintillator which is formed out of a group of columnar crystals in which crystals of a fluorescent material emitting fluorescence when irradiated with radiation have grown into columnar shapes; and
a photodetector which is provided on a radiation entrance side of the scintillator and which detects the fluorescence emitted by the scintillator as an electric signal; wherein:
a high activator density region whose activator density is higher than activator density of a region on an opposite side to the radiation entrance side in the scintillator is provided and disposed on the photodetector side in the scintillator; and
a low activator density region whose activator density is lower than the activator density of the high activator density region is provided in a position closer to the photodetector than the high activator density region in the scintillator.

2. The radiological image detection apparatus according to claim 1, wherein:
the scintillator is pasted onto the photodetector.

3. The radiological image detection apparatus according to claim 1, wherein:
a non-columnar portion including non-columnar crystals is provided in a position closer to the photodetector than the high activator density region in the scintillator.

4. The radiological image detection apparatus according to claim 3, wherein:
activator density in the non-columnar portion is lower than the activator density in the high activator density region.

5. The radiological image detection apparatus according to claim 3, wherein:
a void ratio of the non-columnar portion is zero or substantially zero.

6. The radiological image detection apparatus according to claim 3, wherein:
the non-columnar portion is not thinner than 3 μm and not thicker than 50 μm.

7. The radiological image detection apparatus according to claim 1, wherein:
the scintillator adheres to the photodetector.

8. The radiological image detection apparatus according to claim 1, wherein:
a host of the fluorescent material is CsI, and an activator is Tl.

9. The radiological image detection apparatus according to claim 1, wherein:
the activator density of the region on the opposite side is zero or substantially zero.

10. The radiological image detection apparatus according to claim 1, wherein:
activator density of the scintillator varies stepwise from the high activator density region toward the region on the opposite side.

11. The radiological image detection apparatus according to claim 1, wherein:
   activator density of the scintillator varies linearly and continuously from the high activator density region toward the region on the opposite side.

12. The radiological image detection apparatus according to claim 2, wherein:
   activator density of the scintillator decreases discontinuously from the high activator density region toward the low activator density region.

13. The radiological image detection apparatus according to claim 2, wherein:
   activator density of the scintillator decreases continuously from the high activator density region toward the low activator density region.

14. The radiological image detection apparatus according to claim 2, wherein:
   the activator density of the low activator density region is zero or substantially zero.

15. The radiological image detection apparatus according to claim 2, wherein:
   the activator density of the low activator density region is different from the activator density of the region on the opposite side.

16. The radiological image detection apparatus according to claim 2, wherein:
   the low activator density region is not thinner than 5 μm and not thicker than 50 μm.

17. The radio logical image detection apparatus according to claim 2, further comprising:
   a protective film which covers and sealing the scintillator.

18. A method for manufacturing the radiological image detection apparatus according to claim 1, comprising:
   forming the scintillator by a vapor deposition method with changing at least of one of conditions of activator heating temperature, vacuum degree, support temperature and deposition rate.

19. The method for manufacturing a radiological image detection apparatus according to claim 18, further comprising:
   pasting the photodetector integrally with the scintillator formed on a support, from an opposite side to the support.

20. The radiological image detection apparatus according to claim 1, wherein:
   the scintillator is pasted onto the photodetector; and
   a front end of each of the columnar crystals is formed into a tapered shape.

21. A radiological image detection apparatus comprising:
   a scintillator which is formed out of a group of columnar crystals in which crystals of a fluorescent material emitting fluorescence when irradiated with radiation have grown into columnar shapes; and
   a photodetector which is provided on a radiation entrance side of the scintillator and which detects the fluorescence emitted by the scintillator as an electric signal; wherein:
   a high activator density region whose activator density is higher than activator density of a region on an opposite side to the radiation entrance side in the scintillator is provided and disposed on the photodetector side in the scintillator; wherein:
   the activator density in the high activator density region is higher than an activator density half-value which is an activator density corresponding to ½ of a width of variation of the doping density varying in a crystal growth direction of the fluorescent material; and
   activator density in the region on the opposite side to the radiation entrance side is lower than the activator density half-value.

22. The radiological image detection apparatus according to claim 21, wherein:
   a low activator density region whose activator density is lower than the activator density of the high activator density region is provided in a position closer to the photodetector than the high activator density region in the scintillator.

* * * * *